Patented June 19, 1928.

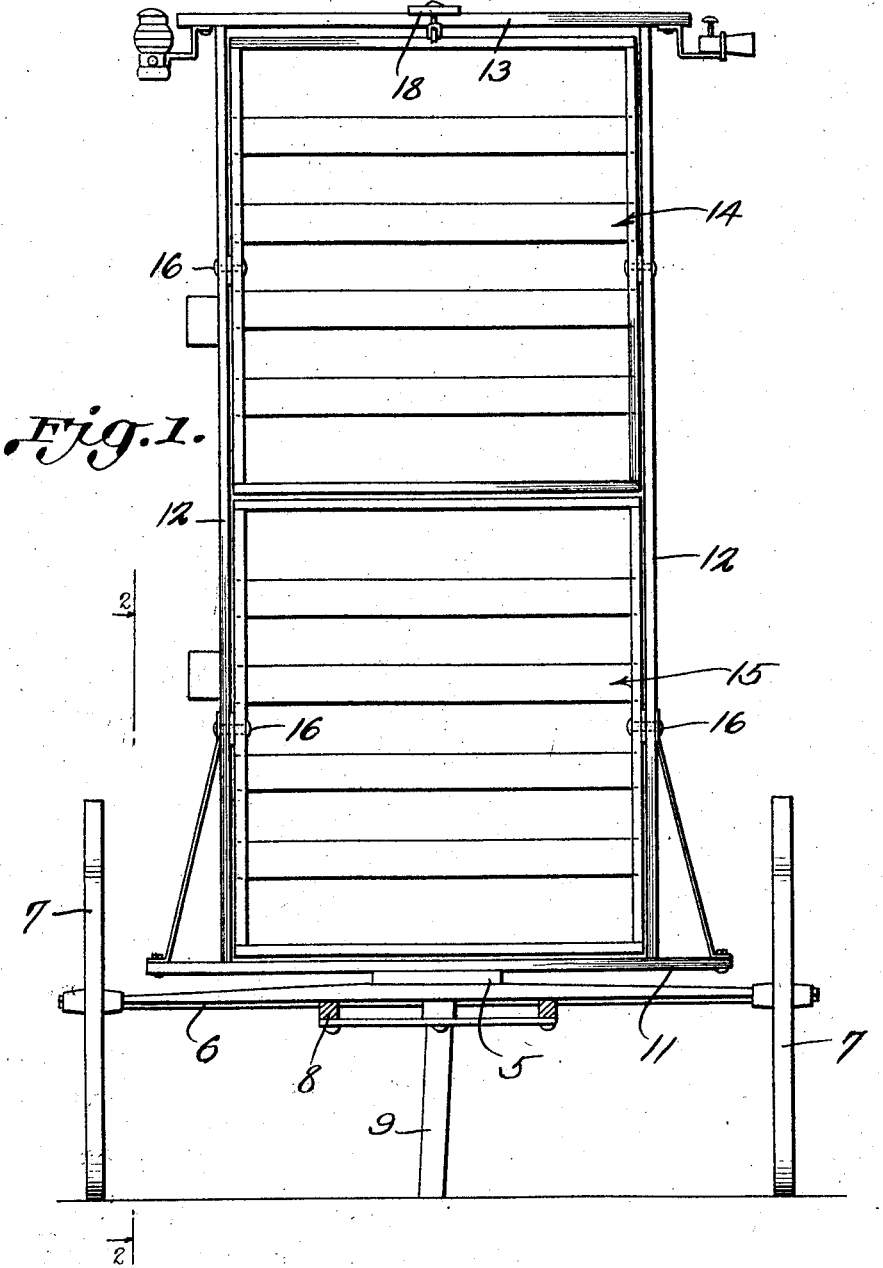

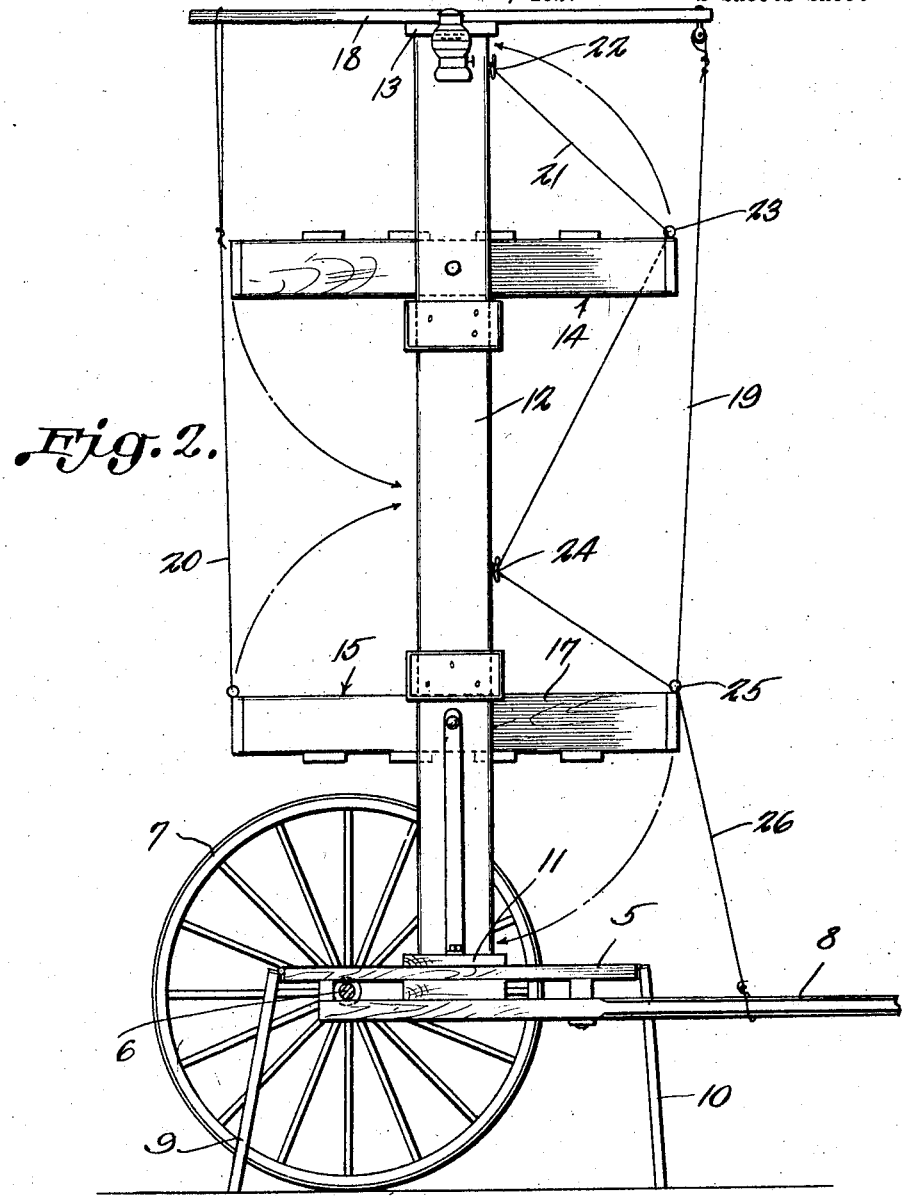

1,674,518

UNITED STATES PATENT OFFICE.

JOHN W. PARSONS, OF CRESTON, WASHINGTON.

FRUIT GATHERER.

Application filed June 6, 1927. Serial No. 196,789.

The present invention relates to a device especially designed for use by fruit gatherers and aims to provide novel means whereby fruit may be hand picked with facility, and with comfort to the picker.

An important object of the invention is to provide a device of this character which will elevate the picker to a point in proximity to the fruit, the device being so constructed that the picker may support his basket or fruit box adjacent to him while the same is being filled.

A still further object of the invention is to provide a device of this character which may be easily moved from place to place during the picking operation.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a front elevational view of a device constructed in accordance with the invention.

Figure 2 is a sectional view taken on line 2—2 of Figure 1.

Referring to the drawings in detail, the reference character 5 designates a platform or body which may be of any desired construction, the same being mounted on the axle 6 on which the wheels 7 are mounted.

The reference character 8 indicates shafts by means of which the device may be moved from place to place.

In order that the platform or body portion may be held in an upright position, hinged supporting arms 9 and 10 are provided, which are designed to swing downwardly to contact with the ground surface in a manner as shown by Figure 1.

The invention also embodies a bar 11 that is disposed transversely of the platform, to which bar the uprights 12 are secured, the uprights being arranged in suitable spaced relation with each other and connected at their upper ends by the horizontal bar 13.

The uprights 12 and bar 13 together with the platform provide a frame or supporting structure within which the movable platforms 14 and 15 respectively are pivotally mounted.

As shown more clearly by Figure 2 of the drawings, these platforms 14 and 15 are mounted on the pins 16, so that they may swing to horizontal positions as indicated at 17, to the end that a fruit gatherer may sit on one of these platforms to pick the fruit in reach from the platform.

Extending at right angles with respect to the bar 13 and disposed intermediate the ends thereof is a bar 18 to which the cables 19 and 20 are connected, which cables also connect with the lower platform 15 to the end that the platform 15 is held in a horizontal position.

The reference character 21 indicates the flexible member or cable that has one end thereof secured at 22 and passes through the eye 23 secured to the upper platform 14, from where the flexible member passes over the member 24 disposed below the platform 14. The cable also passes through the eye 25 where it is secured. Connected with the eye 25 is a flexible member 26 that also connects with the shafts 8 to the end that when the platforms 14 and 15 are moved to their horizontal positions as shown by Figure 1, they may be secured in such positions to support the weight of the person using the device.

I claim:

A wheeled support for fruit pickers including a wheel supported frame, spaced uprights secured to the wheel supported frame at the lower ends of the uprights, upper and lower platforms pivotally supported intermediate their ends and mounted between the uprights, a bar connecting the upper ends of the uprights, a bar extending transversely of the first mentioned bar and having its ends extended beyond the outer ends of the platform, cables connected to the last mentioned bar at points adjacent to the outer ends thereof, said cables being connected with the lower platform to secure the lower platform in a horizontal position, and a cable secured to one of the uprights and to the upper and lower platforms, to secure the platforms against movement when in their active positions.

In testimony that I claim the foregoing as my own, I have hereto affixed my signature.

JOHN W. PARSONS.